United States Patent [19]

Dassero

[11] Patent Number: 5,276,474
[45] Date of Patent: Jan. 4, 1994

[54] COMPACT CAMERA WITH FOLDING FLASH UNIT

[75] Inventor: William F. Dassero, Rochester, N.Y.

[73] Assignee: Eastman Kodak Company, Rochester, N.Y.

[21] Appl. No.: 4,868

[22] Filed: Jan. 19, 1993

[51] Int. Cl.$^5$ .............................. G03B 15/03
[52] U.S. Cl. ..................... 354/149.11; 354/126
[58] Field of Search ................ 354/149.11, 126

[56] References Cited

U.S. PATENT DOCUMENTS

| | | | |
|---|---|---|---|
| 4,106,037 | 8/1978 | Nakamura et al. | 354/128 |
| 4,166,680 | 9/1979 | Maitani | 354/126 |
| 4,261,658 | 4/1981 | Uchiyama et al. | 354/126 |
| 4,331,405 | 5/1982 | Yamamoto | 354/126 |
| 4,734,733 | 3/1988 | Clapp et al. | 354/149.11 |
| 4,796,034 | 1/1989 | Leonard et al. | 354/145.1 |
| 4,893,139 | 1/1990 | Alligood et al. | 354/149.1 |
| 5,036,345 | 7/1991 | Kawano | 354/126 |
| 5,107,287 | 4/1992 | Swayze | 354/149.11 |

*Primary Examiner*—Monroe H. Hayes
*Attorney, Agent, or Firm*—Roger A. Fields

[57] ABSTRACT

In a compact camera including a flash unit that pivots between a folded storage position integrated with the camera body and an unfolded use position elevated from the camera body, the flash unit has respective parts that lie within separate cavities in the rear, top, and one end of the camera body when the flash unit is in its storage position.

5 Claims, 3 Drawing Sheets

COMPACT CAMERA WITH FOLDING FLASH UNIT

BACKGROUND OF THE INVENTION

1. Field of the Invention

The invention relates generally to photography, and in particular to a compact camera with a pivotally folding flash unit. More specifically, the invention relates to a compact camera having a flash unit that is flipped up from the camera body for use and is flipped down towards the camera body for storage.

2. Description of the Prior Art

A current trend in most camera design is to incorporate an electronic flash unit in the camera housing and yet make the housing relatively small in order to improve its ease of storage, portability and handling. As a consequence of making the camera housing small, however, the separation between the built-in flash unit and the taking lens is reduced, which possibly creates an undesirable effect commonly known as "red-eye". When using a flash unit and color print film, red-eye is typified by the pupils in the eyes of a person being photographed coming out red-tinted on a resulting color print. This phenomenon is attributable to the incidence into the taking lens of the red light reflected from the retinas in the person's eyes illuminated by the flash light.

Red-eye may be substantially avoided by increasing the separation between the flash unit and the taking lens. As a result, the light emitted from the flash unit will reach the eyes of a person being photographed at too great an angle to be reflected by his or her retinas into the taking lens. In this connection, U.S. Pat. No. 4,261,658, issued Apr. 14, 1981, discloses a compact camera comprising a camera body, a taking lens, and a flash unit pivotally supported for swinging movement about a pivot axis parallel to an optical axis of the taking lens between a folded storage position received within a top cavity in a top face of the camera body and an unfolded use position standing up out of the top cavity to increase the separation between the flash unit and the taking lens.

PROBLEMS TO BE SOLVED BY THE INVENTION

The camera design disclosed in prior art U.S. Pat. No. 4,261,658 does not lend itself to compactness. Also, when the flash unit is in its storage position, a flash emission window of the flash unit faces out of the top cavity, permitting the window to be scratched.

SUMMARY OF THE INVENTION

According to the invention, a compact camera comprising a camera body, a taking lens, and a flash unit pivotally supported for swinging movement about a pivot axis parallel to an optical axis of the taking lens between a folded storage position received within a top cavity in a top face of the camera body and an unfolded use position standing up out of the top cavity, is characterized in that:

the flash unit includes a side support part pivotally connected to the camera body to lie within the top cavity, when the flash unit is in its storage position, and a flash-emitting head part extending from the side support part to lie within a separate end cavity in an end face of the camera body with a flash emission window of the head part facing inwardly in the end cavity, when the flash unit is in its storage position, and to be removed from the end cavity with the window facing in the same direction as the taking lens, when the flash emission window is in its use position.

More specifically, the flash unit includes a rear support part extending from the side support part to lie within a separate rear cavity in a rear face of the camera body, when the flash unit is in its storage position, and to stand up out of the rear cavity, when the flash unit is in its use position.

DETAILED DESCRIPTION OF THE PREFERRED EMBODIMENT

The invention is described as being embodied in a compact 35 mm camera with a folding flash unit. Because such 35 mm cameras are generally well known, this description is directed in particular to camera elements forming part of or cooperating directly with the preferred embodiment. It is to be understood, however, that camera elements not specifically shown or described may take various forms known to persons of ordinary skill in the art.

Figure 1:
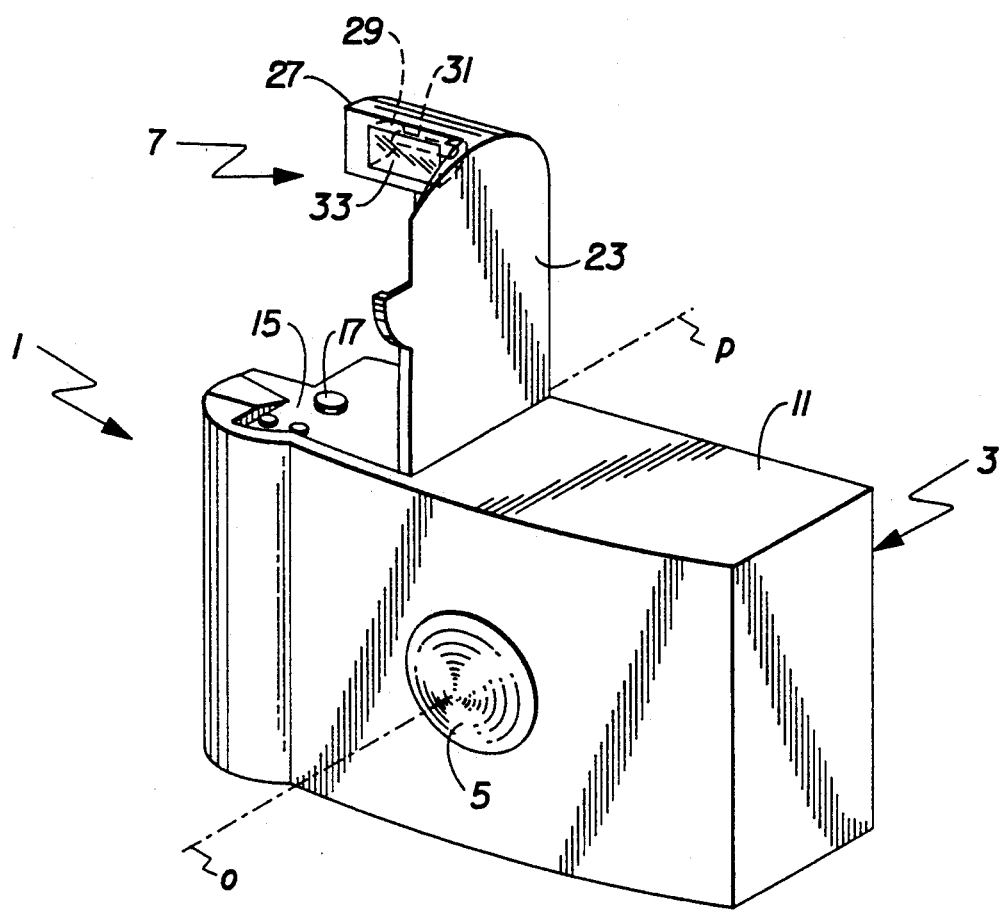
FIG. 1 is a front perspective view of a compact camera with a folding flash unit according to a preferred embodiment of the invention, showing the flash unit in an unfolded use position.
Figure 2:
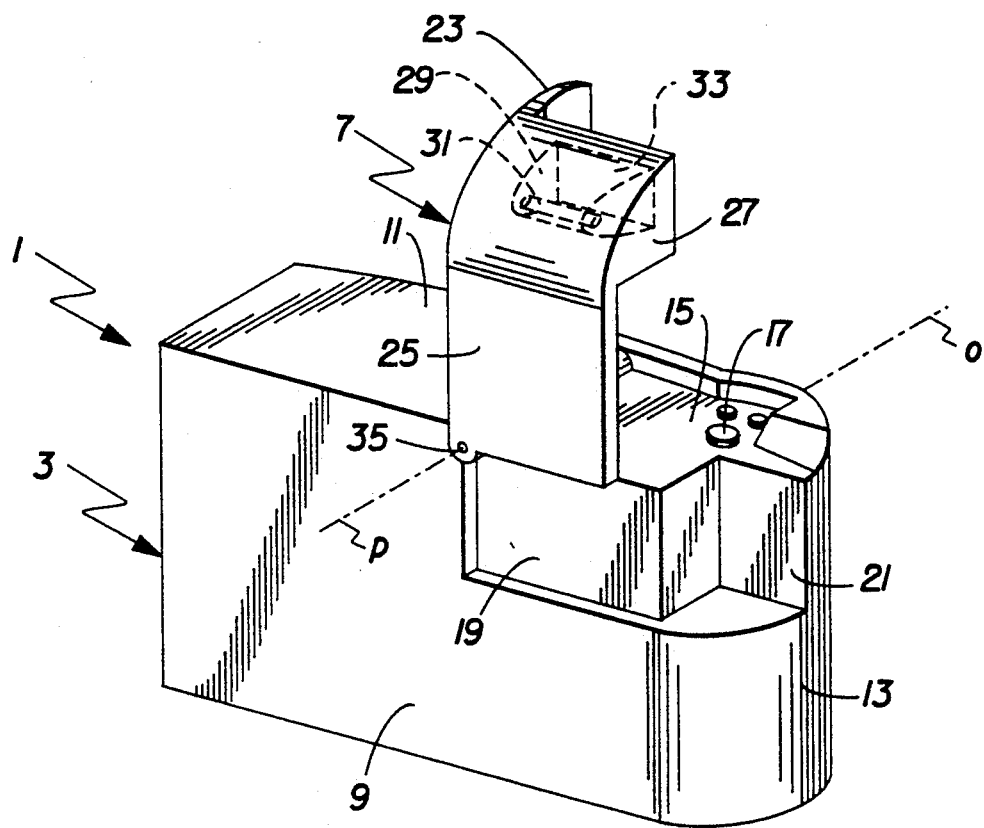
FIG. 2 is a rear perspective view of the compact camera similar to FIG. 1.
Figure 3:
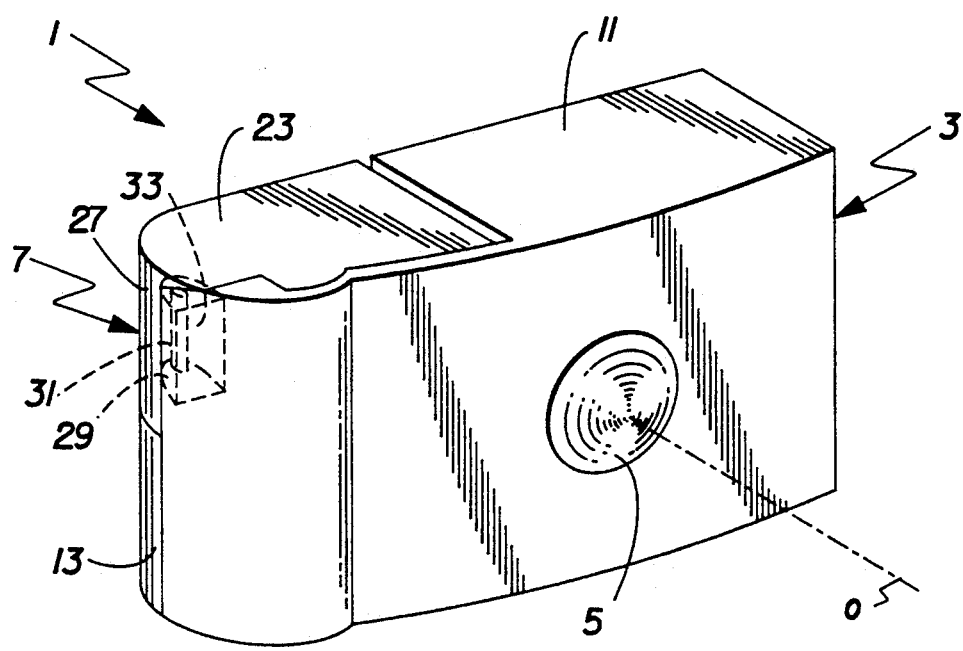
FIG. 3 is a front perspective view of the compact camera, showing the flash unit in a folded storage position.

Referring now to the drawings, FIGS. 1-3 depict a compact 35 mm camera 1 comprising a camera body 3, a taking lens 5 having an optical axis O, and a flash unit 7.

The camera body 3 includes a rear face 9, a top face 11, and an end face 13. See FIGS. 1 and 2. The top face 11 has a top cavity 15 in which is located a shutter release button 17. The rear face 9 and the end face 13 have respective contiguous rear and end cavities 19 and 21.

The flash unit 7 includes a substantially thin, flat side support part 23 and a substantially thin, flat rear support part 25 which are integrally formed perpendicular to each other, and a flash-emitting head part 27 integrally extending sidewise from the side support part and frontwise from the rear support part. See FIGS. 1 and 2. The head part 27 includes a parabolic-shaped flash reflector 29 in which is mounted a flash tube 31 and on which is mounted a front flash emission window 33. A pivot pin 35 connects the rear support part 25 to the rear face 9 of the camera body 3 to support the flash unit 7 for swinging movement about a pivot axis P parallel to the optical axis O of the taking lens 5 between a folded storage position shown in FIG. 3 and an unfolded use position shown in FIGS. 1 and 2. In the folded storage position, the side support part 23 lies completely within the top cavity 15 to cover the shutter release button 17, the rear support part 25 lies completely within the rear cavity 19, and the head part 27 lies completely within the end cavity 21 with the flash emission window 33 facing inwardly (forwardly) in that cavity. In the unfolded use position, the side support part 23 stands up out of the top cavity 15, the rear support part 25 stands up out of the rear cavity 19, and the head part 27 stands up out of the end cavity 21 with the flash emission window 33 elevated above the top face 11 to direct light towards a subject to be photographed.

The invention has been described with reference to a preferred embodiment. However, it will be appreciated that variations and modifications can be effected by persons of ordinary skill in the art without departing from the scope of the invention.

I claim:

1. A compact camera comprising a camera body, a taking lens, and a flash unit pivotally supported for swinging movement about a pivot axis parallel to an optical axis of said taking lens between a folded storage position received within a top cavity in a top face of said camera body and an unfolded use position standing up out of said top cavity, is characterized in that:

said flash unit includes a side support part pivotally connected to said camera body to lie within said top cavity, when the flash unit is in its storage position, and a flash-emitting head part extending from said side support part to lie within a separate end cavity in an end face of the camera body with a flash emission window of said head part facing inwardly in said end cavity, when the flash unit is in its storage position, and to be removed from the end cavity with said window facing in the same direction as said taking lens, when the flash emission window is in its use position.

2. A compact camera as recited in claim 1, wherein said flash unit includes a rear support part extending from said side support part to lie within a separate rear cavity in a rear face of said camera body, when the flash unit is in its storage position, and to stand up out of said rear cavity, when the flash unit is in its use position.

3. A compact camera as recited in claim 2, wherein said side support part and said rear support part are substantially flat thin pieces which are arranged perpendicular to each other.

4. A compact camera as recited in claim 3, wherein said flash-emitting head part extends sidewise from said side support part and frontwise from said rear support part.

5. A compact camera as recited in claim 2, wherein a shutter release button is located in said top cavity to be covered by said side support part when said flash unit is in its storage position.

* * * * *